Figure 1:
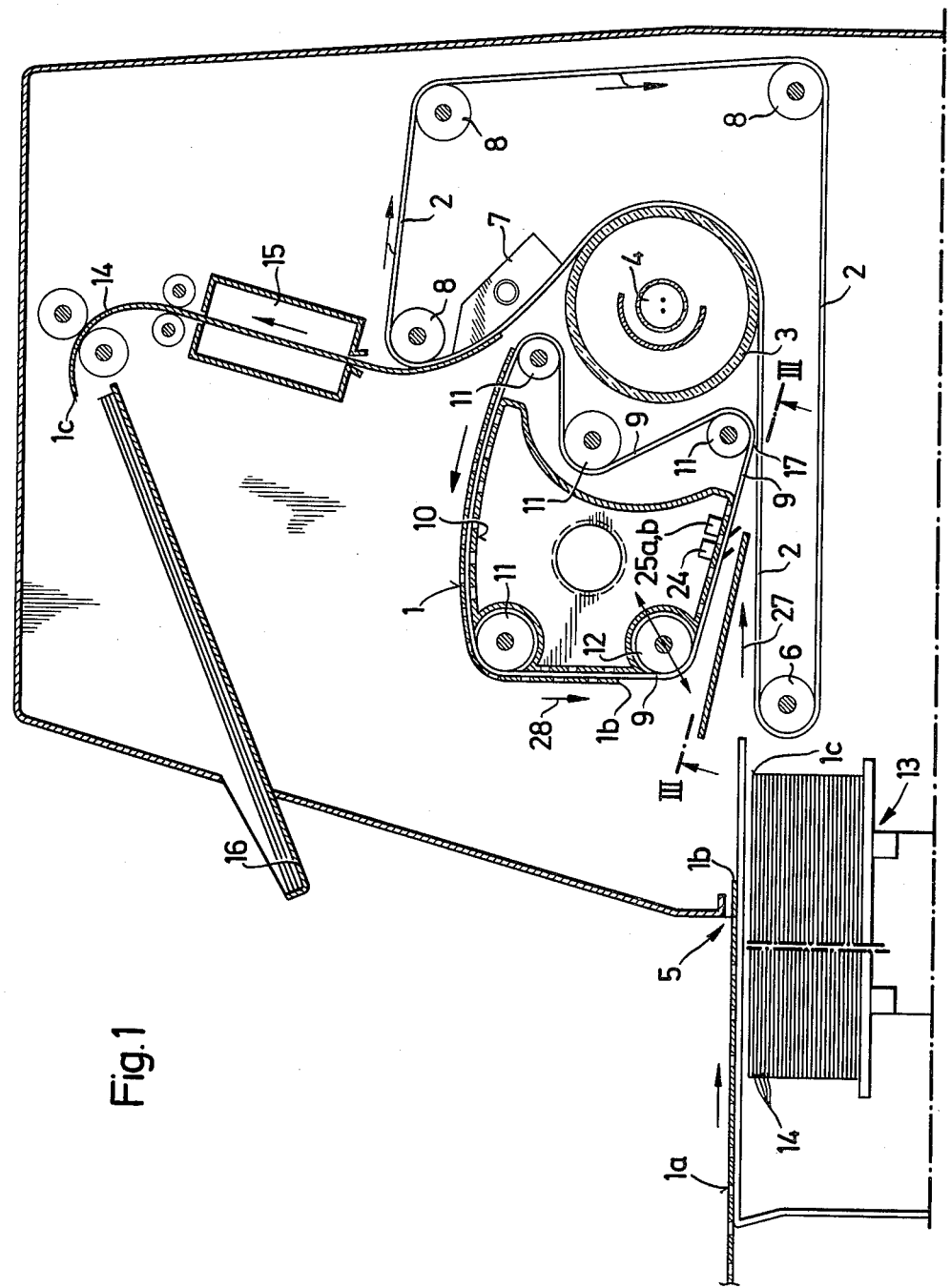

United States Patent [19]

Schröter

[11] 4,082,456
[45] Apr. 4, 1978

[54] DEVICE FOR ADJUSTING AN ORIGINAL TO BE COPIED

[75] Inventor: Herbert Schröter, Taunusstein, Germany

[73] Assignee: Hoechst Aktiengesellschaft, Germany

[21] Appl. No.: 753,628

[22] Filed: Dec. 23, 1976

[30] Foreign Application Priority Data

Dec. 27, 1975  Germany .............................. 2558874

[51] Int. Cl.² ............................................. G03B 27/12
[52] U.S. Cl. ..................................... 355/109; 198/415; 271/227; 318/618; 355/48; 355/50
[58] Field of Search ................ 217/227, 251; 318/618; 355/109, 102, 110, 111, 50, 51, 48, 49, 14; 198/395, 401, 415

[56] References Cited

U.S. PATENT DOCUMENTS

| 3,400,212 | 9/1968 | Plummer | 318/618 X |
| 3,578,861 | 5/1971 | Kobayashi | 355/109 X |
| 3,603,446 | 9/1971 | Maxey et al. | 271/227 X |
| 3,709,596 | 1/1973 | Ulmer | 355/109 |
| 3,754,826 | 8/1973 | Kobayashi et al. | 355/109 |

*Primary Examiner*—Richard A. Wintercorn

*Attorney, Agent, or Firm*—James E. Bryan

[57] ABSTRACT

This invention relates to an improvement in a device for adjusting an original to be copied, in particular an original which is repeatedly conveyed through the exposure station of a photocopying machine, including a transport mechanism with a deviatable transport band arrangement adapted to transport said original at a variable speed, and when said original is to be copied a number of times, in a closed path, further including a device for lengthening the path on one side, two switches positioned transversely and normal to the direction of flow and adapted to be actuated by the original whereby a switching circuit to a servomotor is closed when the leading edge of the original deviates from a correct position, said servomotor being connected to a correcting element adapted to change the length of the path of the original on one side of said transport band arrangement, the improvement comprising generator means adapted to put out a first signal proportional to the transport speed of said original, said servomotor having a rotational speed proportional to a second signal supplied thereto, and means connecting said generator means to said servomotor by at least one transfer element adapted to proportionately transform or transduce said first signal into said second signal.

6 Claims, 4 Drawing Figures

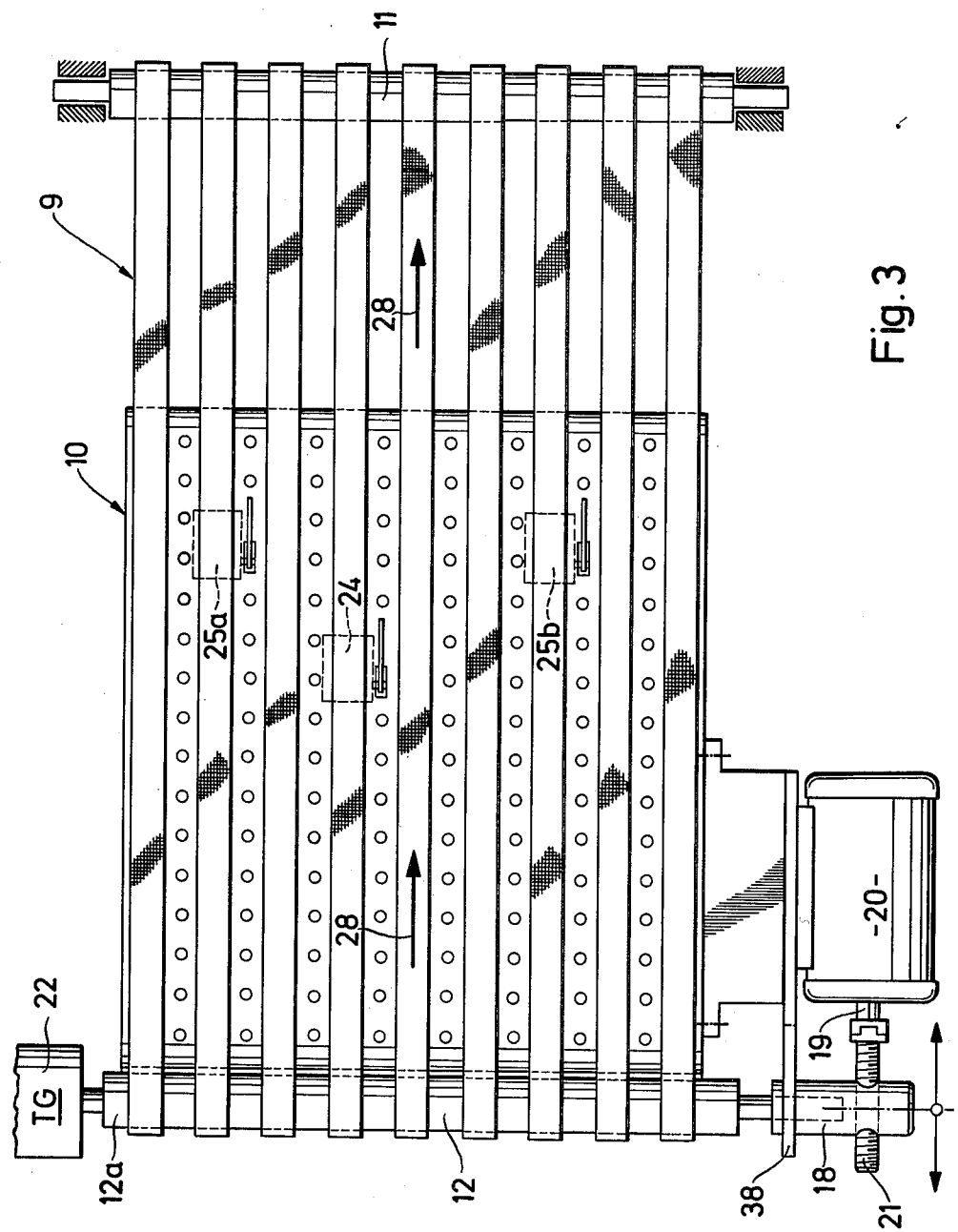

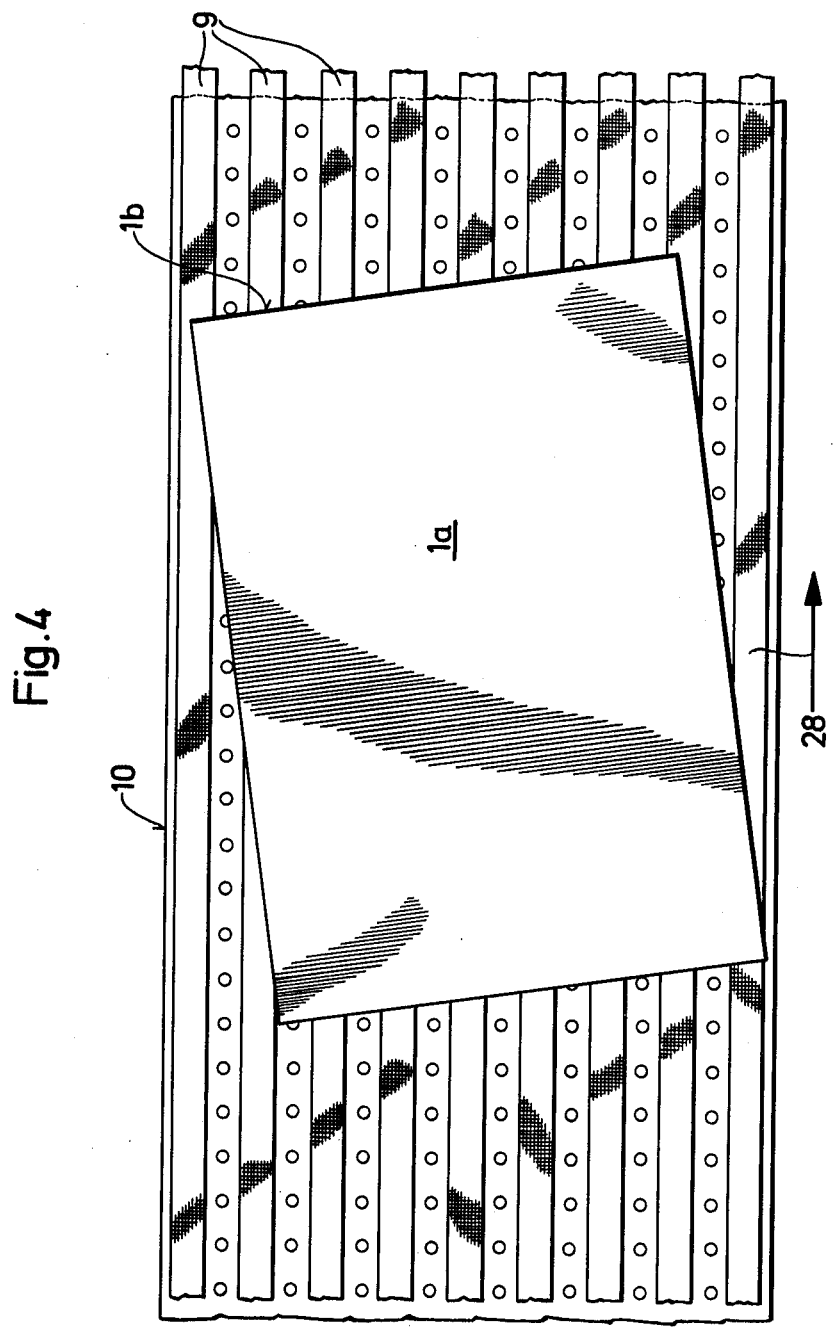

DEVICE FOR ADJUSTING AN ORIGINAL TO BE COPIED

This invention relates to a device for adjusting an original to be copied, in particular an original which is repeatedly conveyed through the exposure station of a photocopying machine.

When originals to be copied are repeatedly conveyed through the exposure stations of copying machines, especially of photocoyping machines, there is the problem that an original which circulates in a closed path several times, depending upon the required number of copies, does not necessarily have the correct position to be entirely in register with the copying material when it meets the copying material prior to each exposure. This phenomenon is, e.g., caused by imprecise working of the transport and guiding elements arranged along the path, even if the original had been exactly adjusted before it was copied for the first time.

In order to adjust the original for repeated copying, the position of the leading edge of the original is determined and an appropriate correcting movement initiated, in a known device of the above-mentioned type (DT-AS No. 2,247,566). Before the original, travelling along the path, meets another sheet of the copying material the position of its leading edge is determined by two parallelly aligned switches (micro switches), which are mounted normal to the direction of transport in the transport path and are actuated by the original. These switches are part of a circuit arrangement further comprising a servomotor and a current source which supplies a substantially constant current or a constant voltage, respectively. The circuit arrangement is such that the servomotor is not supplied with current when both switches are simultaneously actuated by an exactly positioned leading edge of an original. If, however, the leading edge arrives in an oblique position and the micro switches are actuated in succession, a current whose direction depends upon the sequence of switch actuation flows through the servomotor during the interval between actuation of first one and then the other of the two switches. The position of the original is then corrected by changing the length of its path on one side of a transport band arrangement.

For this purpose, a roller deviating the transport path and supported at one end in a sliding nut is movable in such a way that the path of the original is lengthened or shortened on the side adjacent to this support. This sliding nut is connected to the shaft of the servomotor by a threaded spindle. As long as only one of the two micro switches is closed, the servomotor rotates at virtually constant speed in the indicated direction so that by movement of the sliding nut via the spindle the path is either shortened or lengthened at the transport band, and the leading edge of the original is adjusted to adopt the correct position. It is apparent that the working time of the servomotor depends upon how much time elapses between actuation of the two switches by the leading edge of the original and, therefore, on how far the leading edge deviates from the correct position. If there is a large deviation from the correct position, the time interval between actuation of the micro switches is comparatively long and the servomotor is kept in operation for a corresponding period of time. In case of a minor deviation and consequently a shorter time interval between actuation of the switches, the servomotor performs only a slight correcting movement.

It is thus possible to approach the position of the leading edge to the correct position. An exact adjustment of the original is, however, achieved only if the copying equipment, in particular the photocopying machine, operates at one fixed transport speed only. Assuming the same oblique position of the leading edge, any variation of the transport speed of the original causes a corresponding change of the time intervals during which the micro switches are in different positions. It follows that — assuming the same oblique position — the original is more or less imperfectly adjusted at different transport speeds.

The object of the present invention is, therefore, to improve the positional adjustment in such a manner that the leading edge of the original invariably adopts the correct position as exactly and as reliably as possible, even at different transport speeds which may change automatically, in particular depending upon the light permeability of the original.

In order to solve the problem in question a method is employed, among others, which is known in connection with a device incorporated in a copying machine. This device provides for the automatic control of the travelling or transport speed of the original and the copying material, depending upon the transparency of the original (DT-OS No. 2,263,952). Accordingly, it is known to the prior art to establish a factor as a function of the respective travelling speed. This factor represents a period of time calculated as a function of the travelling speed, during which period of time a photosensitive unit for measuring the transparency is connected to a memory in order to control the speed of a driving motor of the transport mechanism in accordance with the voltage of the memory. Contrary to the present invention, however, a time interval is calculated as a function of the corresponding travelling speed which, for any travelling speed, results in a predetermined maximum length of the original scanned by means of a photosensitive measuring unit.

The solution to the problem posed in connection with the device for adjusting an original to be copied, in particular an original which is repeatedly conveyed through an exposure station, is based on the principle that during a time interval corresponding to the oblique position of the original, the servomotor adjusting the path of the original on one side of the transport band arrangement by means of the correcting element is supplied with a signal which proportionately influences the rotational speed of the servomotor and which is related to the transport speed of the original. The amount of obliquity which causes actuation of first only one and then the other of the two switches in the path of the original is thus finally expressed as the product of the time interval needed by the oblique section to pass the switches and a factor corresponding to the transport speed. If the device is correctly adjusted in accordance with a constant factor incorporating the unchangeable parameters of the device, the oblique position of the original can be exactly corrected for practically any transport speed.

A first signal proportional to the transport speed of the original may be, for example, a direct voltage, a frequency of an alternating current or a pulse frequency of a pulse generator. The servomotor which is to be supplied with a second signal may be either a D.C. or an A.C. motor. In order to adapt the servomotor to the generator, an element normally will be provided which transforms or transduces the signal put out by the generator. In case the servomotor is equipped to handle the type of signal generated by the generator, at most a transformer must be provided to adapt the servomotor to the generator. If, however, the generator puts out a different type of signal, proportional to the transport speed, which cannot be handled by the servomotor, a transducer is used as a transfer element to convert the signals generated by the generator into signals which can be received by the servomotor. The transformers used may be current or voltage transformers. Converting transfer elements are, for example, required if a pulse generator puts out a pulse frequency proportional to the transport speed of the original to be copied, the servomotor, however, is a D.C. motor. In this case a pulse voltage transformer would have to be constructed as a transfer element.

The generator and the servomotor can be coordinated in such a manner that the servomotor is able to directly take up the signal put out by the generator.

It is practical to construct the device using a tachogenerator as the generator and a servomotor with a rotational speed proportional to voltage which is connected to the tacho-generator via an amplifier when the circuit is closed. A tacho-generator may be in any event incorporated in the device to determine the transport speed, e.g. for the automatic control of the throughput speed of the original and the copying material as a function of the transparency of the original. An amplifier, e.g. a thyristor circuit arrangement, for the amplification of the voltage put out by the tacho-generator as a supply for the servomotor, is relatively inexpensive as compared to converting transfer elements.

In the mechanical portion of the device, the path of the original is on one side lengthened or shortened by simple deflection of the support provided at one end of a roller which determines the length of the path of the original.

Further, it is especially advantageous to construct the device such that a displacement of the sliding nut past its two final positions on the spindle is avoided, if in these final positions of the siding nut another signal is received by the servomotor, which would otherwise cause a further displacement of the sliding nut. In case of such undesired occurrences, the servomotor is switches off the generator or the transfer element connected to the generator; switching off is effected by limit switches which via a timing element are connected to switches arranged in the circuit of the servomotor. The servomotor is then supplied with a preferably constant voltage during a preferably fixed period of time so that the sliding nut leaves the respective final position and is automatically moved back into a central position. It thus never will be impossible to correct the position of an oblique original because the correcting element already has adopted a final position and cannot be further moved into the direction required for positional adjustment.

The servomotor may be, as mentioned, during a fixed period of time, appropriately connected to a source delivering a constant current in order to change over the correcting element. For this purpose, the limit switches first actuate switches incorporated in the motor supplies; the motor is switched off the generator or the transfer element, respectively, and connected to the source delivering a constant current. The motor is connected in such a manner that, depending upon the final position adopted, the motor shaft is turned in either sense of rotation and moves the correcting element back into its central position.

Figure 2:
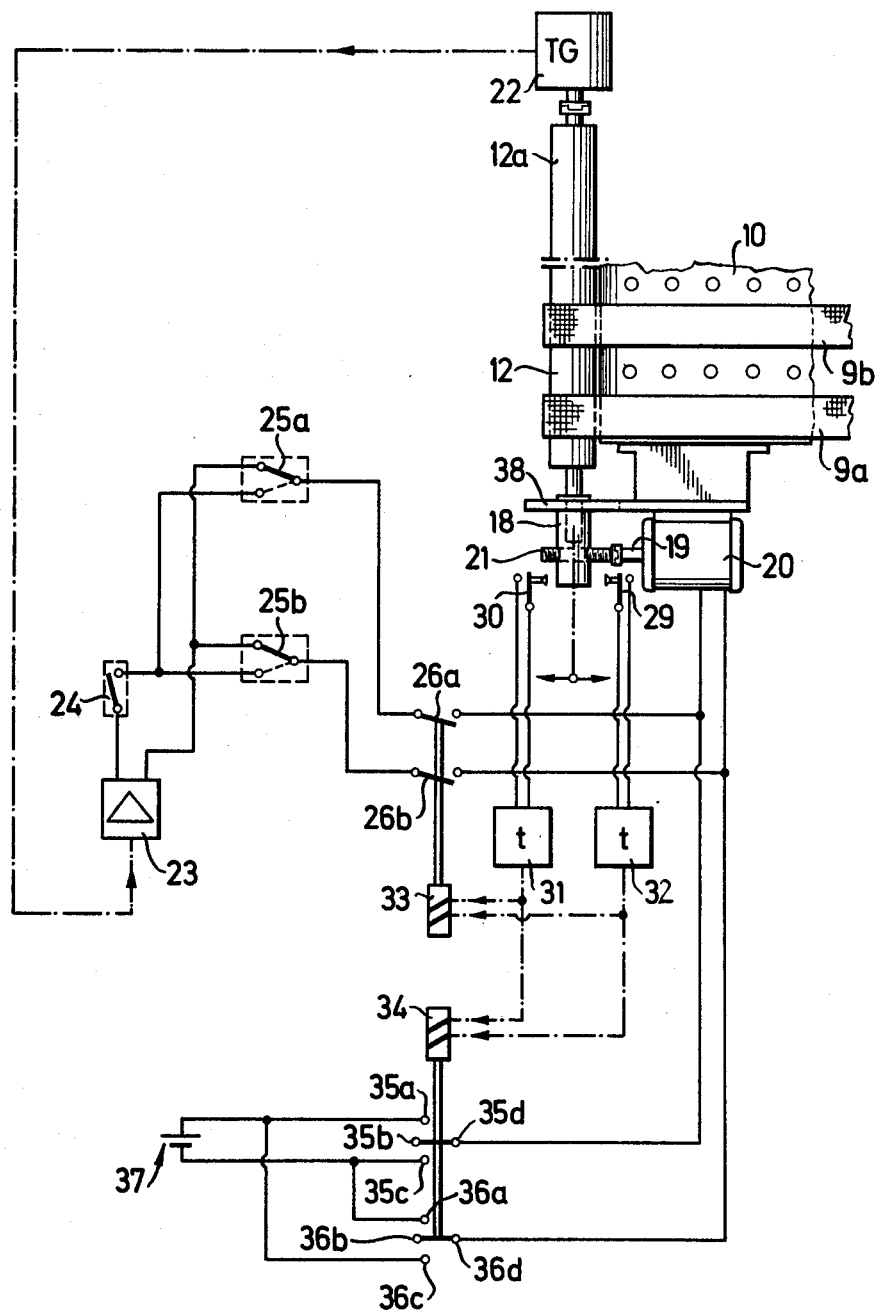

One embodiment of the invention will be further described with reference to the accompanying drawings, in which:

FIG. 1 is a diagrammatic sectional view of part of a photocopying machine, in particular showing the path of an original to be copied, FIG. 2 shows a device incorporated in this photocopying machine for changing the length of the path on one side which, together with the circuit arrangement, also diagrammatically shown in this figure, serves to adjust an original, FIG. 3 shows the spatial arrangement of switches included in the circuit in a plan view in the direcion III - III of FIG. 1 showing part of the path, and FIG. 4 shows an unadjusted original on a section of the path.

In FIG. 1 part of the transport path of an original 1 to be copied is formed by a section of a transport band 2 which lies against part of a main cylinder 3 having a light source 4 inside. From a feed station 5 for the original, where a drive roller 6 is provided for the transport band 2, the transport band 2 is quided over the main cylinder, passes a separating device 7 and an arrangement of idling rollers 8 and returns to the feed station 5.

A further section of the path for the original is formed by the second transport band 9. This section is determined by the shape of a suction box 10 inside the second transport band and by the arrangement of the rollers 11 and 12. The roller 12 (double arrow) differs from the other rollers 11 in that it can be displaced on one side approximately normal to the path, i.e. one side of the path can be lengthened or shortened at this point.

Transport bands 2 and 9 are connected to a drive motor, not shown in FIG. 1.

Inside of the photocopying machine shown in FIG. 1 a dispenser 13 is provided for the sheets of copying material 14. By a mechanism not shown in the figure, the copying material is removed from the stack and brought into register, either at the feed station 5, with a first original 1a, or at a meeting point, with an original 1 returning from the main cylinder 3.

In any event, a sheet of copying material 14 is, together with the original 1 or 1a, passed by the main cylinder 3. At the separating device 7 the exposed sheet of copying material 14 is separated from the original 1 or 1a and transported through a developing chamber 15 to an output receiving station 16. The original removed at the separating device 7 is, by the second transport band 9, conveyed over the suction box 10 up to the meeting point 17, where it is brought together with another sheet of copying material 14. The original 1 will circulate in the closed path until the required number of copies has been made. In order to ensure that the original arrives at the meeting point 17 with its leading edge 16 exactly normal to the direction of transport and exactly parallel with the leading edge 1c of the next sheet of coyping material 14, the following precautions are taken:

FIG. 2 shows the roller 12 which is displaceable on one side at the support. Displacement is effected by a sliding nut 18 which is mounted in a guide plate 38 in such a manner that it can be displaced normal to the axis of the roller 12, but cannot perform a rotary movement. The sliding nut 18 is coupled with a threaded spindle 21 connected to the shaft 19 of a servomotor 20. According to the position of the sliding nut 18, the individual bands 9a, 9b, etc. of the second transport band 9 are more or less stretched so that on this side the path is either longer or shorter than for a central or opposite position of the sliding nut and the displaceable roller 12. A tacho-generator 22 is coupled with the fixed end of the roller 12, and the tacho-generator is connected to an input of an amplifier 23. The amplifier may, in particular, comprise a thyristor circuit arrangement. By a switch 24 the output of the amplifier is connected to two switches 25a and 25b arranged substantially parallel to each other, and the amplifier is connected to the servomotor 20 by the relay contacts 26a and 26b. Part of the circuit arrangement in FIG. 2 is represented as a signal flow plan (dash-dotted line), e.g. from the tacho-generator to the input of the amplifier 23, while another part is shown as a circuit diagram, e.g. from the output of the amplifier 23 to the servomotor 20.

The spatial arrangement of the scanning switches is shown by FIGS. 1 and 3.

According to these Figures, the scanning elements of the scanning switches 24, 25a, 25b in the path of the original are positioned at the second transport band arrangement 9 in the direction of transport, upstream of the meeting point 17. The directions of transport of the transport band arrangements 2 and 9 are marked in the Figures by the arrows 27 and 28.

The scanning switch 24 is a simple closing switch, whereas the scanning switches 25a and 25b are change-over switches. The fixed contacts of the change-over switches can be connected to one output terminal each of the amplifier; the movable contact of each change-over switch is connected to an input terminal of the servomotor.

In addition, FIG. 2 shows a resetting device for the roller 12 which is displaceable on one side. The resetting device comprises one end switch each, 29 and 30, on either side of the sliding nut 18. Each end switch is connected to the input of a timing element, 31 and 32. Each output of these timing elements 31 and 32 is run to a relay coil 33 and a relay coil 34. The relay coil 33 serves to actuate the breaking contacts 26a and 26b in the connecting lines between the amplifier 23 and the servomotor 20, while the relay coil 34 actuates the switch contacts 35a, 1 36a, 35c, 36c arranged in pairs, each with an intermediate breaking contact 35b and 36b. Contacts 35a and 36c are connected to one pole of a power source 37. Contacts 35c and 36a are linked with the other pole of this power source and the movable contacts 35b and 36b are connected to the servomotor 20.

In order to adjust originals to be copied, the device operates as follows:

If an original 1 arrives in an oblique position, as shown in FIG. 4, so that it cannot be brought into exact register with a sheet of copying material 14 at the meeting point 17, the scanning switches 25a and 25b are successively actuated by the leading edge 1b, after the scanning switch 24 has been switched on (FIG. 3). As shown in FIG. 4, the switch 25b is first changed from a neutral position into the position of the movable contact marked with a dotted line (FIG. 2). As a result, a circuit is closed between the amplifier output 23 and the servomotor 20. The servomotor 20 is actuated and displaces the sliding nut 18 via the spindle 21 in order to lengthen the second transport band arrangement 9 adjacent the sliding nut. The original is thereby adjusted. The adjusting movement of the servomotor 20 is maintained until the leading edge 1b of the original 1 also actuates the scanning switch 25a. The servomotor is then connected to only one output terminal of the amplifier 23 and is no longer supplied with current. As can be seen from FIG. 2, the servomotor rotates in an opposite direction and shortens the second transport band arrangement, if first the scanning switch 25a and then the scanning switch 25b is actuated by the leading edge of the original.

In any event, the adjusting movement is maintained during a period of time corresponding to the interval between actuation of the two scanning switches 25a and 25b. This interval is for only a certain transport speed of the original a standard for the deviation of the leading edge from the correct position. In the present example a corrective factor is additionally introduced. For this purpose, a voltage corresponding to the transport speed is taken from the tacho-generator 22 and amplified by means of the amplifier 23. The output signal of this amplifier 23 serves to supply the servomotor 20. Despite different transport speeds, a displacement of the sliding nut and of the roller 12 displaceable on one side is thus ensured, which is in strict accordance with the deviation of the leading edge of the original from the correct position. If, for instance, the original is transported comparatively rapidly so that for a given deviation of its leading edge from the correct position a relatively short interval lies between the actuation of the scanning switches 25a and 25b, the comparatively high transport speed is taken into account by the signal (voltage) put out by the tacho-generator. During this interval, the amplifier 23 supplies the servomotor with a signal exactly corresponding to the signal put out by the tacho-generator and which may be an amplified voltage or a current proportional to this voltage.

In a similar manner, for a relatively slow transport speed, attention is paid to the fact that the leading edge of the original does not deviate from the correct position as far as might be concluded from the interval between actuation of the scanning switches 25a and 25b.

Thus, the servomotor is during a relatively long interval supplied with the signal put out by the amplifier 23. However, since this signal is determined by the rotational speed of the tacho-generator 22, the sliding nut 18 is displaced proportionately to the deviation of the original.

When the device operates in the manner described above, the breaking contacts 26a 26b are always closed, establishing a connection between the servomotor 20 and the scanning switches 25a and 25b. The device is also equipped to prevent the sliding nut 18 from exceeding its final position; the sliding nut should, if possible, rather assume a central rest position in order to enable a maximum correcting movement of the roller 12 displaceable on one side, if the leading edge of the original is oblique. For this purpose, one of the two end switches 29 and 30 is actuated in each final position of the sliding nut. Then, one of the two timing elements 31 and 32 receives an input signal causing an interruption of the connection between the servomotor 20 and the amplifier 23, while the servomotor 20, upon excitation of the relay coil 34, is supplied by the power source 37. The current flows e.g. via the contacts 35a and 35b, 36a and 36b in one direction through the servomotor, when the end switch 29 is closed, and via the contacts 35c, 35d as well as 36c, 36d in the opposite direction, when the end switch 30 is actuated. The relay contacts are kept closed during a period determined by the timing elements 31 and 32. Then, the relays are released leaving the movable contacts 35d, 36d at contacts 35b, 36b without current, whereas the relay contacts 26a, 26b are again closed.

Consequently, the correcting element is exactly adjusted at any transport speed of a circulating original. It cannot exceed or remain in a given final position, where the original cannot be adjusted.

It will be obvious to those skilled in the art that many modifications may be made within the scope of the present invention without departing from the spirit thereof, and the invention includes all such modifications.

What is claimed is:

1. In a device for adjusting an original to be copied, in particular an original which is repeatedly conveyed through the exposure station of a photocopying machine, including a transport mechanism with a deviatable transport band arrangement adapted to transport said original at a variable speed, and when said original is to be copied a number of times, in a closed path, further including a device for lengthening the path on one side, two switches positioned transversely and normal to the direction of flow and adapted to be actuated by the original whereby a switching circuit to a servomotor is closed when the leading edge of the original deviates from a correct position, said servomotor being connected to a correcting element adapted to change the length of the path of the original on one side of said transport band arrangement, the improvement comprising generator means adapted to put out a first signal proportional to the transport speed of said original, said servomotor having a rotational speed proportional to a second signal supplied thereto, and means connecting said generator means to said servomotor by at least one transfer element adapted to proportionately transform or transduce said first signal into said second signal.

2. A device according to claim 1 in which said generator means and said servomotor are capable of putting out and receiving the same signal, whereby said transfer element can be omitted and the first signal equals the second signal.

3. A device according to claim 1 in which said generator means is a tacho-generator, the servomotor has a rotational speed proportional to voltage, and including amplifier means connected between said tacho-generator and said servomotor when the circuit is closed.

4. A device according to claim 1 in which said correcting element includes threaded spindle means coupled with a shaft of said servomotor, sliding nut means on said threaded spindle, and support means on said nut for a roller deviating the transport path.

5. An apparatus according to claim 4 including an end switch means mounted at each end of a motion path of said sliding nut means, and means connecting said end switch means to switches in a circuit of said servomotor through timing means, whereby said sliding nut means automatically returns from one final position thereof to a central position thereof upon actuation of one of said end switch means.

6. An apparatus according to claim 5 including a power source means supplying a constant voltage adapted to be connected to said servomotor for resetting said sliding nut means.

* * * * *